Aug. 27, 1957 R. C. GUNTER, JR., ET AL 2,803,995
MEANS AND METHOD OF TESTING LENSES
Filed April 7, 1954 3 Sheets-Sheet 2

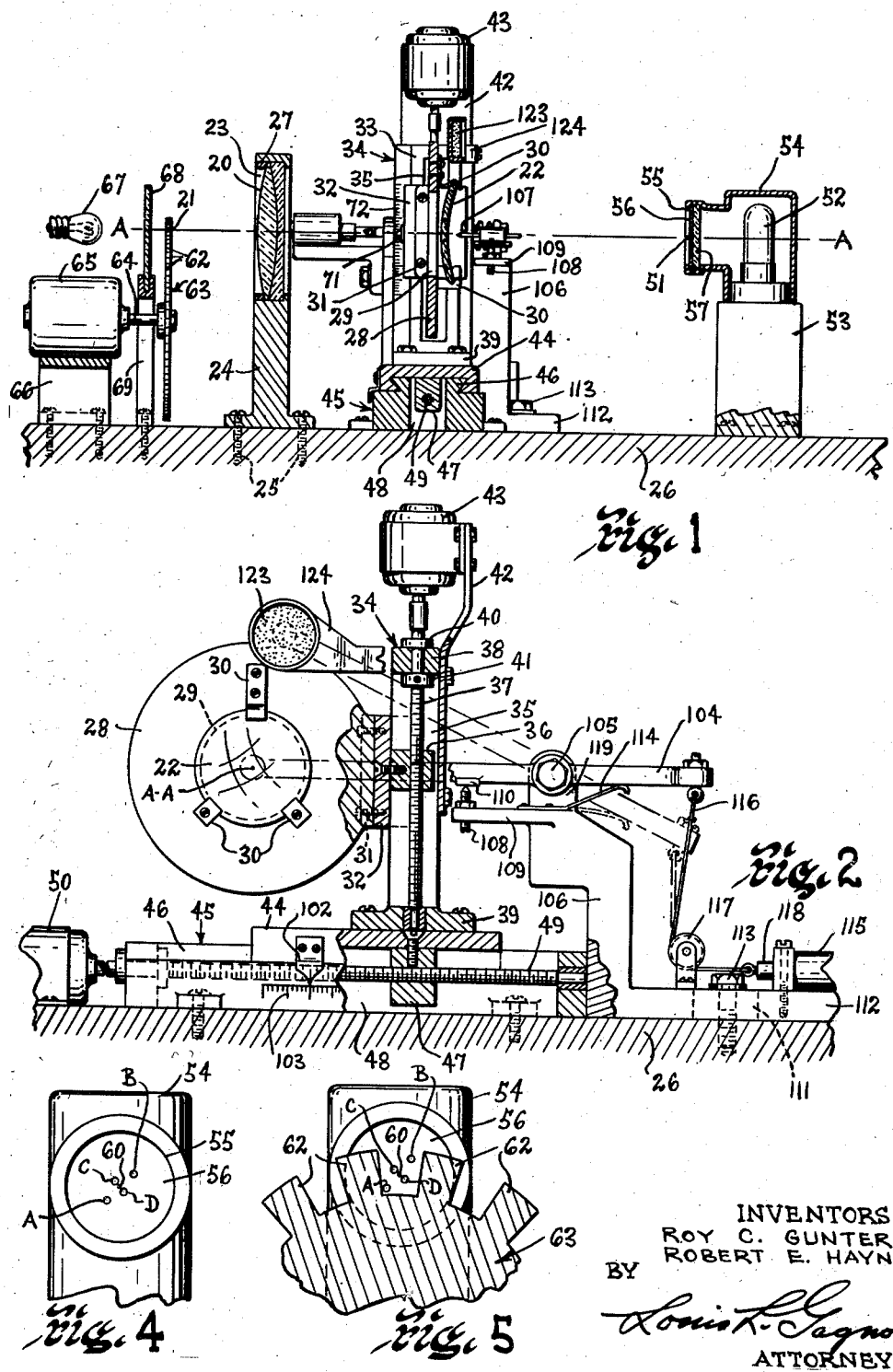

INVENTORS
ROY C. GUNTER JR.
ROBERT E. HAYNES
BY
Louis L. Gagnon
ATTORNEY

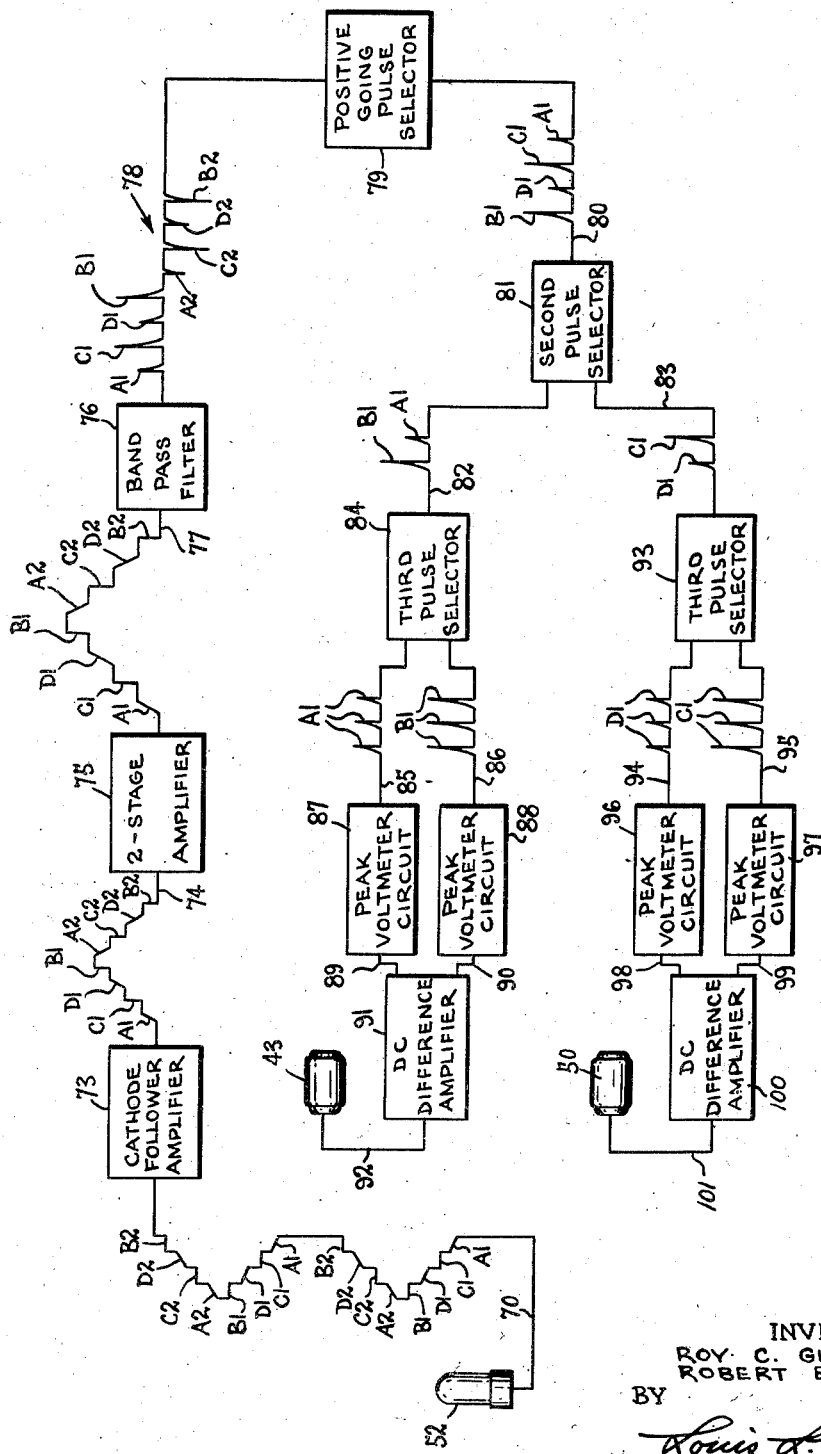

United States Patent Office 2,803,995
Patented Aug. 27, 1957

2,803,995
MEANS AND METHOD OF TESTING LENSES

Roy C. Gunter, Jr., Dodge, and Robert E. Havnes, Sturbridge, Mass., assignors to American Optical Company, Southbridge, Mass., a voluntary association of Massachusetts Application April 7, 1954, Serial No. 421,661

4 Claims. (Cl. 88—56)

This invention relates to improvements in lens testing devices and has particular reference to the provision of novel means and method of determining the location of the optical centers of lenses.

In the manufacture of optical lenses which are to be used in ophthalmic mountings, the lenses must each be provided with a predetermined peripheral contour shape which will allow the lenses to be properly mounted in the rims of the mounting. Since modern designs of ophthalmic mountings embody unsymmetrical eye shapes it is sometimes difficult to determine whether a surfaced lens can be subsequently provided with a particular desired peripheral shape while maintaining the optical center in proper positional relation to the mounting in which the lens is to be used and, consequently, to the eye of the wearer. Since the lens is surfaced in accordance with a prescription, the resultant optical center thereof may not be coincident with the geometric center. Therefore, it is desirable to establish the location of the optical center and particularly the position thereof with respect to the geometric center of the lens. It is commonly known that a lens will produce its most clearly defined image of an object along its optical axis. However, a degradation of said image occurs when the object is projected through the lens along axes other than the optical axis.

With this in mind, the present invention deals with image evaluation and to produce an apparatus, such as will be described hereinafter, for automatically performing such image evaluation, it is essential to directly determine mathematically the distribution of intensity of a particular image of an extended object under a particular type of illumination. The mathematical solution to such a problem can only be properly accomplished by the methods of Fourier analysis which has led to the need of characterizing a lens by its response to "spatial frequencies." The expressions "spatial frequency" and "spatial frequency response" will, for this reason, be used from time to time throughout the following description of the invention. In order to further clarify the subsequent use of said terms it is pointed out that by "spatial frequency" we mean the effect introduced by the occluding and non-occluding of energy (light) at progressively arranged spaced intervals within a given unit distance, the term "frequency" being qualified by the number of such occlusions and non-occlusions within said unit distance. By response to spatial frequency or "spatial frequency response" we mean the characterization of a lens or the like as determined by the manner in which said lens resolves or modifies the spatial distribution of energy (light) in the image of the object which is formed by the light rays projected through said lens.

In view of the fact that the present invention embodies an electrical network, it is pointed out that said network may also be characterized by its "temporal" frequency response or its temporal amplitude characteristics as modified by said response in which case temporal frequencies would be defined as a periodic variation in energy with respect to time.

Accordingly, one of the primary objects of this invention is the provision of novel means and method of automatically testing lenses or optical systems to determine the location of the optical center thereof by electronically evaluating the image resolving power or spatial frequency response of various portions of the lens or optical system under test as indicated by an infinite number of electrical waves formed by directing a variable light flux through said optical system to a member having apertures therein and then to a photosensitive device, with said light flux at said apertures being of differing intensities in accordance with the existing variations in the image resolving power or spatial frequency response of said lens or optical system at said apertures, adjusting the lens or optical system under test and said member having the apertures therein relative to each other laterally with respect to the axis of the system to the extent necessary to substantially equalize the intensities of the light flux at said apertures.

Another object is to provide novel means and method of determining the location of the optical center of a lens by directing a variable light flux through the lens to a photosensitive device and intercepting the light flux with an opaque member having a group of paired apertures located in predetermined relation with the axis of the system, and electronically analyzing the resultant electric signal formed by the photosenstive device to determine therefrom the characteristics controlled by optical center location, and subsequently moving the lens or opaque member with paired apertures therein to a position where optimum response of the photosensitive device will indicate the optical center of the lens.

Another object is to provide an automatically functioning device of the above character comprising an optical system for projecting a light beam, a target for modulating the light beam, the lens to be tested being disposed in the light beam with its geometric center aligned with the axis of the optical system for directing the resultant modulated light onto an opaque member having a plurality of spaced pairs of apertures located in predetermined spaced relation with the axis of the optical system, a photomultiplier positioned behind the opaque member for receiving the light passing through the apertures therein, which light will form an image of the target at the apertures, the resolution of said image varying in accordance with the variation of the spaced relation of the optical center of the lens under test and axis of the system whereupon the light at the photomultiplier will possess intensity characteristics in accordance therewith, and electronic means for analyzing the signal produced by the photomultiplier and transmitting the resultant analysis to means for adjusting the lens or the opaque apertured member to the extent necessary to compensate for said variation and to equalize said intensity characteristics of the light at the apertures and thereby cause the light falling upon the photomultiplier and passing through each of the apertures to possess substantially equal intensity characteristics, whereby the extent of such adjustment will indicate the optical center of the lens.

Another object is to provide improved means and method of the above character for automatically locating the optical center of a lens under test and embodying means for subsequently marking the location of said optical center by placing an identifying mark upon a surface of the lens in said location.

Other objects and advantages of this invention will become apparent from the following description taken in connection with the accompanying drawings, in which:

Fig. 1 is a diagrammatic view of a system embodying the present invention;

Fig. 2 is a transverse sectional view illustrating the lens-supporting and dotting mechanism;

Fig. 4 is an enlarged fragmentary elevational view of the apertured light-receiving member;

Figs. 5 and 6 are diagrammatic illustrations of the scanning method embodied in the device;

Fig. 9 is a diagrammatic illustration of the progress of a wave signal through the electronic means.

Figure 3:
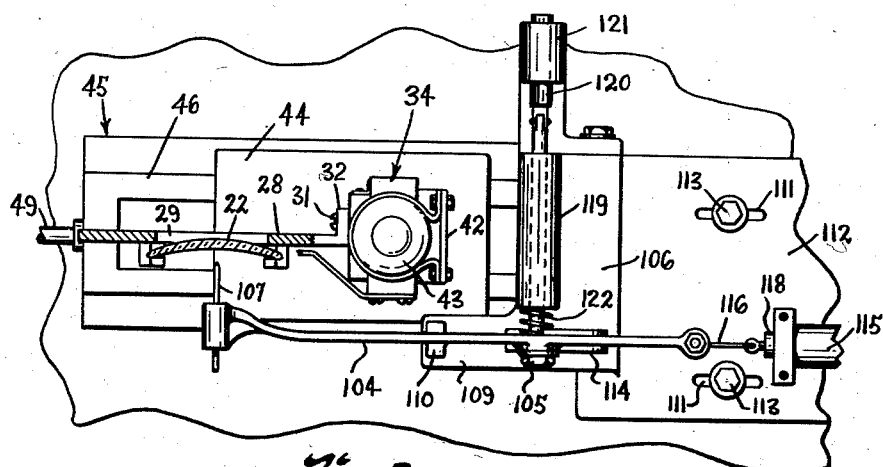
Fig. 3 is a fragmentary top plan view partly in section of the parts of the device shown in Fig. 2.

The basic principle on which an instrument embodying the present invention operates is that optical characteristics of a lens or lens system may be determined by an electronic analysis of a signal created by a light sensitive device responding to variations or modulations of light rays impinging thereupon and as influenced by the lens being tested.

In the present invention, we find that it is possible to utilize electrical waves to arrive at a measurement of the deviation of the optical center of a particular lens under test. It is readily obvious from a consideration of the basic theory of image evaluation or spatial frequency response as a function of axial motion and the known degradation of imagery with transverse motion due to aberrations in a lens under test as discussed above, that the resolving power or spatial frequency response of a lens should decrease on either side of its optical axis assuming that lateral or transverse motion is occurring in a plane approximately through the image plane and at right angles to the optical axis.

A preferred embodiment of the present invention is shown in the attached drawings and comprises an optical system for directing light along a particular axis through the lens under test and through predetermined spaced apertures located substantially at the focal plane of the lens onto a photomultiplier, and an object or target for modulating the light and for forming an image of said object or target at said focal plane of the lens, whereby the lens under test, if off axis, will have varying spatial frequency response and cause said image to be of unequal resolution at at least some of said apertures in accordance with the off axis relation of the optical center of said lens and the axis of the optical system. Upon receiving the image forming light through said apertures, the photomultiplier then creates an electric signal in response to variations in the intensity thereof as affected by any varying spatial frequency response of the lens or unequal resolution of said image at the apertures, said signal having resultant characteristics which when the signal is electronically analyzed will determine the direction and extent of movement of the lens necessary to obtain a substantially equal resolution of said image at all of the apertures which indicates the desired centering of the lens. It is to be understood that the photomultiplier, or other similar light sensitive device to be used, is adapted to function only in response to variations in intensity of the light impinging thereupon. Thus, it is apparent that a variable density target or light modulating means having equally spaced opaque and transparent portions within a given span, when placed in the path of light, will spatially interrupt the light in such a manner as to introduce given spatial intensity characteristics thereto as received by the light sensitive device and when the target is rotated or otherwise scanned, it will additionally impart temporal intensity characteristics to the light or cause the images formed by said spatially interrupted light to be presented to the light sensitive means at a controlled time rate.

The optical system comprises a collimator lens 20 which picks up light from an effective object point 21 and transmits it as effectively parallel rays to a lens 22 under test. The collimator lens 20 is securely mounted in an opening 23 in an upright 24 which is relatively fixedly secured as by screws 25 or the like to a suitable base 26, the lens 20 being held within the opening 23 by any suitable means such as retaining ring 27. The lens 22 under test is positioned and held in a plane at right angles to the optical axis A—A of the system by means of an apertured disk 28 (Figs. 1, 2 and 3). The lens 22 is held in position over the aperture 29 by means such as spring clips 30, and the disk 28 is attached as by bolts or screws 31 to a block 32 which is mounted for sliding movement upon a surface 33 of an upright support 34. The lens 22 thus may be easily removed from and inserted in the device by merely applying manual force thereto of a sufficiency to overcome the inherent resiliency of the spring clips 30. The support 34 is provided with a vertically extending slot 35 into which extends a portion 36 (Fig. 2) of the block 32. Extending vertically through and threadedly connected to the portion 36 is a threaded drive shaft 37 which has its opposed end portions journaled in the respective upper and lower end portions 38 and 39 of support 34. A pair of collars 40 and 41 are secured to the shaft 37 adjacent the opposed inner and outer surfaces of upper end portions 38 of support 34 to prevent longitudinal or vertical displacement of the shaft 37. The support 34 also carries an upwardly extending bracket 42 to which is bolted a reversible motor 43 which is operatively connected to the adjacent upper end of the drive shaft 37. Operation of the motor 43 in one direction will effect rotation of the drive shaft 37 and consequently cause vertical movement of the block 32, disk 28 and lens 22 under test. Reverse rotation of motor 43 will cause the shaft 37 to be rotated in the opposite direction and consequently cause the block 32, disk 28 and lens 22 to also be moved in the opposite direction.

The lower end portion 39 of the support 34 is secured as by screws or the like to a slide 44 which is mounted for sliding movement longitudinally on a bed 45 bolted to the base 26. The bed 45 is provided on its upper surface with a portion 46 (Figs. 1 and 2) having angled sides which are adapted to slidably interfit with a longitudinal grooved or recessed area on the under side of the slide 44, thus providing means for guiding the slide 44 during movement transversely of the device. The slide 44 carries a block 47 which depends from the lower surface thereof into an elongated opening or slot 48 which extends longitudinally within the bed 45. A threaded drive shaft 49 is journaled in the ends of the bed 45 and is operatively connected with the block 47, one end of the shaft 49 being connected to a reversible motor 50 whereby the shaft may be rotated to move the block 47 and slide 44 transversely of the device, and consequently also move the lens holding means carried by the slide 44 in a transverse direction within a plane at right angles to axis A—A, which plane is the same plane in which the lens holding means is movable vertically, as described above, by operation of motor 43. From this it is apparent that the lens 22 under test can be adjusted in any direction within a plane disposed at right angles to the axis A—A of the optical system, such adjustment being accomplished by operation of the motors 43 and 50 either simultaneously or individually.

The light from the object point 21 is directed by collimator lens 20 as substantially parallel rays to the lens 22 under test which functions to then converge the rays, causing them to focus at a remote point 51 in accordance with the plus focal power characteristics of the lens 22.

It is to be understood here that if a lens 22 under test is positioned in a plane at right angles to the axis A—A with its known geometric center on axis A—A, and if the unknown optical center of the lens is coincident with the geometric center, the focal point 51 of the lens under test will also be on axis A—A. However, if the optical center of lens 22 is not coincident with the geometric center thereof, this would cause the light to be focused at a point spaced from the axis A—A in accordance with the spacing between the optical and geometric centers of the lens. Accordingly this invention embodies means for adjusting either the lens 22 or the light-receiving means which is adjacent the focal point 51 to the extent necessary to align the optical center of the lens with axis A—A or to locate the light-receiving means with respect to the optical center of the lens.

To accomplish this a photosensitive device 52 is mounted upon a suitable support 53 secured to the base or shelf 26 and has its effective light-receiving portion disposed on axis A—A in a suitable position for receiving the light rays from lens 22, the photosensitive device 52 being preferably a photomultiplier which is positioned preferably adjacent the focal point 51. Enclosing the photomultiplier 52 is an opaque housing 54 (Figs. 1, 4 and 5) which has an opening 55 in the side thereof directed toward lens 22. Positioned within the opening 55 is an opaque apertured disk 56 and a light-diffusing plate 57 which is positioned immediately inwardly of the disk 56 to diffuse the light which enters through the apertures in the disk 56, the disk 56 being normally positioned substantially at focal point 51.

Figure 6:
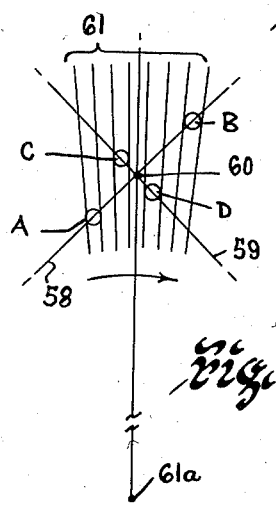

The arrangement of the apertures in the disk 56 is illustrated in the diagram in Fig. 6 wherein two diagonal lines 58 and 59 extend at angles of approximately 45° from the vertical and horizontal and cross at point 60, which point 60 is normally aligned with axis A—A of the system. Two apertures, designated respectively as A and B are located on line 58 and are spaced substantially equal distances from point 60. The apertures are of minute size, being of a diameter smaller than the image occasioned by the highest frequency being used. On line 59 are disposed two apertures C and D which are preferably similar in size to apertures A and B, apertures C and D being disposed substantially the same distances from and on opposite sides of point 60, which distance is, however, different than the spacing of apertures A and B from point 60. It is particularly pointed out here that in Figs. 4 and 5 the apertures A—D are shown greatly enlarged and are actually also much closer together than shown. This arrangement is necessary so that the edge of a scanning member when sweeping across the disk 56 will scan only one aperture at a time and will also traverse a blank area for a short time between each aperture. A succession of positions of such an edge is indicated in Fig. 6 by lines 61 and it is evident that if the edge of a scanning member revolved about a point 61a, for example, in the direction of the arrow it will first scan aperture A, then a blank area, aperture C, a blank area, aperture D, a blank area, and then aperture B. From Fig. 6 it will be noted also that by arranging the apertures substantially as shown, the distance covered by the traversing or scanning edge between each aperture is nearly the same as the distance covered in crossing an aperture.

In the presently described invention the traversing or scanning member is one of a series of occluders 62 (Figs. 1 and 5) which are provided throughout the peripheral edge of a target or disk 63. The target 63 is mounted on a shaft 64 for rotation by a motor 65, the motor 65 being supported as by a motor bracket 66 on the base 26 in such a position that the disk or target 63 is in a plane substantially at right angles to axis A—A and upon rotation of said target, the occluders 62 pass through the effective object point 21 and are temporally successively imaged by the lens under test at its focal plane.

In operation of the device, the effective object point 21 is illuminated by means such as a suitable lamp 67, the light from the lamp 67 first being diffused by a diffusing plate 68 supported between the lamp 67 and the effective object point 21 by means such as a standard 69 mounted on the base 26. Light from object point 21, when one of the spaces between the occluders 62 is aligned with axis A—A, is converted by collimator lens 20 to effectively parallel rays which are focussed and directed by the lens 22 under test toward the effective image point 51 in or near the plane of the apertured disk 56. The light thus will pass through the apertures A, B, C and D and will eventually impinge upon the photomultiplier 52. The light, however, will intermittently fall upon the photomultiplier 52 since the motor 65 rotates target 63 and causes the occluders 62 to successively cross axis A—A at object point 21.

The lens holding means is initially located at effectively zero; that is, the geometric center of the lens 22 is aligned with axis A—A. Now if the optical axis of the lens 22 is coincident with the geometric center the focal point will be located on axis A—A. In such a case the optical characteristics of the lens is such that said lens will cause the resolution of the portion of the image registered with aperture A to be of substantially the same light intensity pattern as that part of the same image which is registered at aperture B, that is, the lens response to the spatial frequency of the light passing therethrough, which spatial frequency is introduced by the image forming scanning member, is such as to present image portions of the same resolution at apertures A and B. Imagery at aperture C will likewise be of substantially the same resolution as at aperture D. The photomultiplier functions in response to variations in light intensities, as will be described hereinafter, and, in accordance with this invention, since substantially no difference exists in this case in intensities of light passing through the respective apertures in each pair of apertures, no adjustment will be made and the lens 22 under test will be known to have an optical center coincident with the geometric center. At this time the dotting mechanism, also to be described hereinafter, will function to identify the location of the optical center by placing a dot on a surface of the lens at the exact location of the optical center.

However, if the optical center of the lens 22 under test is not coincident with the geometric center, then the focal point thereof will accordingly be spaced from axis A—A. For example, if the focal point of the lens 22 is above axis A—A as indicated at 51a in Fig. 8, then it is apparent that the optical center X is not coincident with the geometric center Y and the imagery of the spatially modified light at upper aperture C (Fig. 6) will be of better resolution and of greater intensity than the imagery of the light at lower aperture D. Likewise imagery of said spatially modified light at upper aperture B will be of better resolution and of greater intensity than the imagery of the light at lower aperture A. Since the photomultiplier functions in response to variations in light intensity, the rotation of the image forming scanning member or target will introduce temporal differences in the resultant intensity of the light impinging upon the photomultiplier 52 from apertures A and B and control the operation of one of the motors 43 and 50 while similar temporal differences in resultant intensity of light from apertures C and D will control operation of the other motor 43 or 50. Therefore, in the above example both motors will operate to move the lens holding means until the lens 22 has been adjusted to a position wherein the optical center X of the lens 22 is aligned substantially with axis A—A, in which case substantially equal image resolution occurs at respective apertures A and B, likewise at respective apertures C and D.

The electronic mechanism for controlling the operation of motors 43 and 50, and consequently movement of the lens 22 under test, is adapted to operate in response to a signal created by the photomultiplier in response to variations in intensities of light impinging thereupon as a result of differences in resolution of the image of the target at the respective apertures A—B and C—D as effected by variation of the optical center of the lens from an optimum position, that is, from coincidence with the geometric center or with axis A—A.

Figure 7:
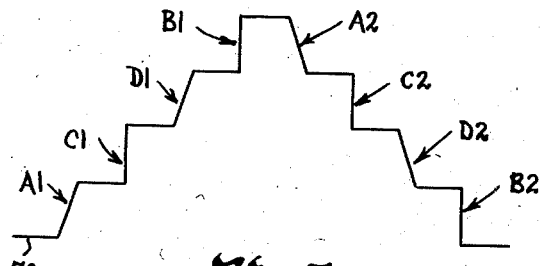
Fig. 7 is a diagram of a wave shape formed by the photosensitive device.
Figure 8:
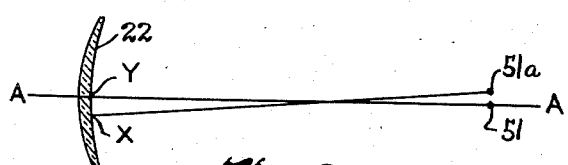
Fig. 8 is a diagram illustrating one condition of the device used as an example in the specification.

Therefore, assuming again that the lens 22 is tending to direct light toward a focal point lying above axis A—A as indicated in Fig. 8, it is apparent that an occluder 62 will scan the apertures A, B, C and D to block off light passing to the photomultiplier 52 and then, in continuing its scanning cycle, will pass on and allow the light to form an image of its trailing side edge portion, which image forming light will pass through the apertures to the photomultiplier. It is particularly pointed out here that each occluder 62 is of a size sufficient to simultaneously cover all the apertures A, B, C and D as is each space between the occluders. As an occluder scans the apertures, aperture A will first be exposed to the image of said occluder. For simplicity of description it is to be assumed that when image forming light is permitted to pass through aperture A, a step A1 of a complex wave (Fig. 7) is formed. The light intensity at the photomultiplier 52 remains constant as said trailing edge of the occluder scans the area between apertures A and C, but when aperture C is exposed another portion or step C1 in the complex wave is formed. The occluder continues scanning in this manner until apertures D and B are exposed to create steps D1 and B1 respectively in the complex wave. Then the leading edge of the next in the series of occluders scans the apertures in the same sequence, gradually blocking off light passing to the photomultiplier. This creates the series of descending steps A2, C2, D2 and B2 of the complex wave.

It has been stated above that the photomultiplier 52 responds to variations in the intensity of the image forming light impinging upon it. Therefore, to continue the above example, if the light rays from the lens 22 tend to focus above axis A—A, then the imagery of the light at aperture C will be of better resolution and greater intensity than at aperture D. Likewise the imagery of the light at aperture B will be of better resolution and greater intensity than at aperture A. Thus the vertical slope of step C1 of the complex wave will be more nearly perpendicular to the zero line of the signal 70 than the vertical slope of step D1. Likewise the vertical slope of step B1 will be more nearly perpendicular than that of step A1. This will also be true of the corresponding vertical slopes of the trailing sides of the complex wave, that is, the vertical slope of step B2 will be more nearly perpendicular than the slope of step A2 and the vertical slope of step C2 will be more nearly perpendicular than the slope of step D2.

It is apparent that passage of a succession of occluders 62 across the object point 21 will cause the photomultiplier 52 to intermittently operate to form a wave signal of electric energy comprised of a series of complex waves as shown in Fig. 9, each wave having the steps formed as the result of scanning the apertures A, B, C and D. Such a complex wave signal as shown in Figs. 7 and 9 is substantially as seen on an oscillograph screen.

In this invention since the resolution of the image at aperture A is to be compared with the resolution of the image at aperture B, then the slope of step A1 must be compared with the slope of step B1. Simultaneously the slope of respective steps C1 and D1 are also compared. This must be done to determine whether the motor 43 controlled by the image forming light passing through apertures A and B must be operated to vertically adjust the lens 22 under test and whether the motor 50 controlled by the image forming light passing through apertures C and D must be operated to adjust the lens 22 transversely. In the present example, since the resolution of the image at aperture A is not equal to the resolution of the image at aperture B, as indicated by the different slopes of steps A1 and B1, this indicates that the optical center of the lens is not vertically aligned on axis A—A. Similarly unequal resolution of the image at apertures C and D indicate transverse adjustment is required. Thus, since resolution of the image is better and its intensity is greater at aperture B than at aperture A, motor 43 must operate to raise the lens 22 until the resolution of the image at both apertures A and B is substantially the same and since resolution of the image is better at C than at D the lens must also be moved transversely.

An electronic analysis of the wave signal 70 produced by the photomultiplier 52 and particularly of each complex wave of the signal 70, is then made to compare the respective slopes of the steps A1 and B1 and of the steps C1 and D1. This is done by electronic mechanism connected with the photomultiplier 52 and the result is transmitted to the motors 43 and 50. When the motor 43 has operated to move the lens 22 to an extent where equal resolution of the images is produced at both apertures A and B, the slopes of the steps A1 and B1 of the complex wave of signal 70 will be substantially equally angled with respect to the zero or base line of the wave signal 70 and thus operation of the motor 43 will cease. An indicator 71 carried by the movable lens supporting block 32 will indicate on a scale 72 carried by the upright 34 the extent of movement of the lens in a vertical direction. Also, when motor 50 has operated to move the lens 22 to an extent where equal resolution of the image occurs at apertures C and D, the slopes of steps C1 and D1 of the complex wave of signal 70 will be substantially equally angled with respect to the base line of the signal, whereupon operation of motor 50 will cease. The extent of transverse adjustment of the lens is indicated by an indicator 102 on slide 44 which functions cooperatively with a scale 103 on the bed 45.

The electronic means referred to above includes a cathode follower amplifier 73 which receives the wave signal 70 directly from the photomultiplier 52. As the signal 70 passes through the cathode follower amplifier the impedance is lowered and the signal now indicated by numeral 74 is passed on to a two-stage amplifier 75. The amplifier 75, being a two-stage type, will cause a 360° phase shift of the signal while increasing the output and thus will transmit signal 77 in greatly amplified form to a band pass filter 76. The signal 77 emerging from the two-stage amplifier 75 will when seen on an oscillograph screen appear to be shaped substantially as shown in Fig. 7 wherein it will be noted that the slopes of respective steps A1 and B1 of the complex wave of the signal are unequally angled with respect to the zero or base line of the signal as are respective steps C1 and D1.

Figure 10:
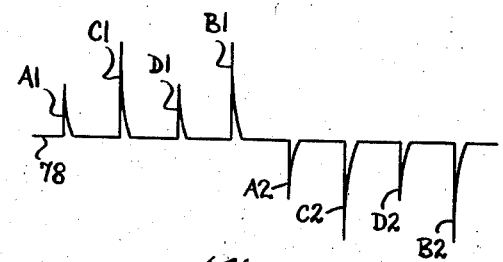
Fig. 10 is a diagram of a wave shape at an advanced point in the electronic cycle.

The band pass filter 76 functions to break up each step of the signal into positive and negative pulses corresponding to the leading and trailing sides or steps of the respective complex waves. The signal 77 going into the band pass filter 76 will be composed of complex waves shaped similarly to the complex wave of Fig. 7 wherein the leading and trailing sides or steps of the complex waves are all disposed above or positively with respect to the zero or base line of the signal. The signal 78 coming out of the band pass filter 76, however will then appear substantially as shown in Fig. 10 wherein each wave of the original signal 77 has been split up so that the leading steps A1—D1 thereof appear in signal 78 as peaks or pulses arranged positively or above the base line of the signal while the trailing sides or steps A2—D2 appear as peaks or pulses arranged below or negatively to the base line of the signal.

The respective peaks of signal 78 corerspond to the steps of the complex wave of signal 77, that is, positive peaks A1, C1, D1 and B1 of signal 78 correspond to the leading steps A1, C1, D1 and B1 of the complex wave of signal 77, and negative peaks A2, C2, D2 and B2 correspond to the trailing steps A2, C2, D2 and B2 of the complex wave of signal 77. It will be noted that since the slopes of the steps B1 and C1 of signal 70 are more nearly perpendicular than are the slopes of respective steps A1 and D1, when differentiated to peaks C1 and B1 of signal 78 which correspond to the steps B1 and C1 of signal 70 will be higher or greater in amplitude than the respective peaks A1 and D1 which correspond to the steps A1 and D1 of signal 70.

After the waves of the signal produced by the photomultiplier 52 have been analyzed to the extent described above, peaks A1 and B1 are electronically compared and the results of the comparison are transmitted to the motor 43 for moving the lens in whichever vertical direction is necessary to align the optical center thereof vertically with respect to axis A—A. Simultaneously peaks C1 and D1 are electronically compared and the results transmitted to motor 50 for moving the lens transversely with respect to axis A—A. To accomplish this the split wave signal 78 (Fig. 9) passes from the band pass filter 76 to a positive going pulse selector 79. The particular pulse selector 79 used in this case functions to clip or eliminate all of the negative pulses of the signal 78 and thus the signal 80 coming out of the pulse selector will be comprised only of positive pulses A1—D1. A pulse selector can be used, however, to eliminate the positive pulses if desired rather than the negative pulses. Signal 80 then enters a second pulse selector 81 where peaks A1 and B1 which are to be compared with one another are separated from peaks C1 and D1 which are also to be separately compared with one another. Thus, two signals 82 and 83 come out of the second pulse selector 81, signal 82 comprising only positive peaks A1 and B1 and signal 83 comprising only positive peaks C1 and D1. Signal 82 then enters a third pulse selector 84 which functions again to split the signal into two component signals 85 and 86 wherein signal 85 is comprised only of positive peaks A1 and signal 86 is comprised only of positive peaks B1.

Signals 85 and 86 leaving the third pulse selector 84 then pass on to respective peak voltmeter circuits 87 and 88. Within the peak voltmeter circuits 87 and 88 the positive peaks A1 and B1 of the respective signals 85 and 86 are directed to respective capacitor-resistors (not shown) which function to store up energy and discharge said energy in the form of direct current of a voltage approximately that of the amplitude of said positive peaks A1 and B1 of the respective signals, which peaks A1, as stated above, correspond with the steps A1 of the complex waves of original signal 70 and are of a height or amplitude in accordance with the slopes of said steps A1 of signal 70, and which peaks B1 correspond with the steps B1 of the complex waves of signal 70 and are of a height or amplitude in accordance with the slopes of the steps B1 of signal 70. The action of the peak voltmeter circuits 87 and 88 is such as to produce respective output D. C. signals 89 and 90 in proportion to the amplitude of the respective positive pulses A1 and B1. If signal 90 with respect to ground or zero level, is more positive than signal 89, the output 92 of a difference amplifier 91 into which the signals 89 and 90 are directed will be the difference between signals 89 and 90, and therefore output signal 92 will transmit this difference from the difference amplifier 91 to the motor 43 which will cause the lens 22 to be moved upwardly. If the signal 89 is greater or more positive than signal 90 with respect to ground or zero level the motor 43 will consequently rotate in the opposite direction, thereupon moving the lens 22 downwardly. The rotation of motor 43 functions to move the lens 22 upwardly or downwardly in the particular direction selected by the difference amplifier 91 in accordance with the particular unbalanced condition of signals 89 and 90. Operation of the motor 43 and consequent movement of the lens 22 will continue simultaneous with operation of motor 50, until signals 89 and 90 are substantially equal, in which case the optical center of the lens 22 is vertically aligned with axis A—A, thus directing image forming light through apertures A and B which provides an image of substantially equal resolution at both apertures A and B, and thus creating a complex wave in signal 70 wherein the slopes of steps A1 and B1 are also substantially the same. When such a balanced condition exists no signal is transmitted to the motor 43 and thus the motor 43 will not operate. The indicator 71 co-operating with scale 72 will indicate the extent of vertical movement of the lens.

Returning now to the second pulse selector 81, it is noted that signal 83 coming therefrom comprises pulses C1 and D1 which correspond to the steps C1 and D1 of the complex waves of signal 70. Signal 83 is directed, similar to signal 82, to a third pulse selector 93 wherein the signal is split up into two component signals 94 and 95, component signal 94 comprising only the positive peaks C1 and component signal 95 comprising only the positive peaks D1. Signals 94 and 95 then flow into respective peak voltmeter circuits 96 and 97 for discharging energy in the form of respective direct currents 98 and 99 of voltages approximately that of the amplitude of the respective positive peaks C1 and D1. The resultant signals 98 and 99 flow into a difference amplifier 100 where an output signal 101 will be produced in accordance with the difference in energy of the respective D. C. signals 98 and 99, the output signal 101 of the difference amplifier 100 being transmitted to motor 50 which will function to move the lens 22 in a transverse direction, the actual direction being selected in accordance with the particular unbalanced condition of the D. C. signals 98 and 99, that is, the motor being operable in one direction if signal 98 is more positive than signal 99 and being operable in the opposite direction if signal 99 is more positive than signal 98. When the lens has been moved to such an extent that substantially equal resolution of the image occurs at apertures C and D, then the slopes of steps C1 and D1 of the resultant complex waves of signal 70 will be equal, the peaks C1 and D1 of signals 94—95 will be equal, and thus no signal is transmitted to motor 50, thereby preventing further transverse adjustment of the lens and indicating that the optical center of the lens is aligned with axis A—A.

The indicator 102 on the slide 44 functions co-operatively with the scale 103 on the bed 45, as stated hereinbefore, to indicate the extent of transverse movement of the lens 22 during adjustment thereof. It is understood, of course, that when signals 98 and 99 become balanced that operation of motor 50 will cease, indicating that the optical center of the lens is aligned transversely with respect to axis A—A.

Although the foregoing description refers to the motors 43 and 50 as being mounted so as to tend to move the lens-holding means along respective paths vertical and transverse with respect to the base 26, it is to be understood that other suitable methods can be provided for moving the lens holding means along other predetermined paths. It is apparent, for example, that the motors and drive shafts 37 and 49 associated therewith can be mounted if desired so that the drive shafts will extend parallel with respective lines 58 and 59 (Fig. 6) connecting the respective apertures of each pair of apertures A—B and C—D. It is actually only important that the motors function in response to differences in the resolution of the image falling on the individual apertures of each pair of apertures so as to move the lens in such a manner that its focal point will fall on the axis A—A.

After the lens 22 has been adjusted to the position where its optical center is located on axis A—A as described above, dotting mechanism connected into the electric system may be used to print a dot on one of the lens surfaces to identify the optical center. The dotting mechanism is preferably connected to the electrical system so as to function only when the motors 43 and 50 have ceased operation, and is shown in Figs. 1, 2 and 3. Said dotting mechanism comprises an arm 104 which extends transversely of the device substantially parallel with the bed 45 and is pivotally connected by a pivot stud 105 to a supporting bracket 106 carried by the base 26. The arm 104 is adapted to swing in a vertical plane and is of such a length that one end thereof, preferably the forward end, is enabled to be swung into and out of alignment with axis A—A adjacent the surface of the lens 22 which is to be dotted. The extreme end of the arm 104 carries a dotting instrument such as a needle-like pin 107 which is positioned to extend along axis A—A when the arm 104 is in lowered position. An adjustable stop 108 carried by a protruding portion 109 of the bracket 106 is adapted to be engaged by a pad 110 on the arm 104 to control the extent of downward swinging movement of the arm 104 whereby the pin 107 will be accurately aligned vertically with respect to axis A—A. Transverse adjustment and alignment of the pin 107 with axis A—A is accomplished by means of slots 111 (Figs. 2 and 3) in the base portion 112 of the bracket 106 through which extend bolts 113 which serve to attach the bracket 106 to the base 26. Thus, by transverse adjustment of the bracket 106 on base 26 the pin 107 can be transversely aligned with axis A—A.

A flat spring 114 (Figs. 2 and 3) is attached at one end to the bracket 106 and has its other end bearing upon the underside of arm 104 rearwardly of the pivot stud 105 to constantly urge the forward end of the arm 104 downwardly. The arm 104 is normally held in raised inoperative position away from axis A—A by a solenoid 115 which is secured to the base portion 112 of the bracket 106 and is connected to the rear end of arm by a cable 116 which extends over a pulley 117, as shown in Fig. 2. When the solenoid 115 is energized it will cause the core 118 thereof, to which the cable 116 is attached, to move inwardly, drawing with it the cable 116 causing the adjacent end of the arm 104 to move downwardly, and thus swinging the forward end of the arm 104 and pin 107 upwardly to the position shown by dot-dash lines in Fig. 2.

The bracket 106 has an upper portion 119 which slidably receives the pivot stud 105 (Fig. 3). The arm 104 is located adjacent one end of the pivot stud 105 while the other end of the pivot stud 105 is attached to the core 120 of a second solenoid 121. With the solenoid 121 de-energized, a compression spring 122 on pivot stud 105 between the arm 104 and the upper portion 119 of bracket 106 functions to urge the arm 104 in a direction away from the solenoid 121 and away from the lens 22. In normal inoperative condition of the dotting mechanism, both solenoids 121 and 115 are energized, solenoid 115 functioning as described to raise the arm 104 to a position where the pin 107 is substantially aligned with an ink pad 123 (Figs. 1 and 2) carried by a bracket 124 attached to the upper end of support 34 of the lens supporting means, and solenoid 121 functioning to urge the arm 104 against the action of spring 122 in a direction toward the solenoid 121 whereupon the pin 107 will rest upon the ink pad 123.

In the cycle of operation of the device, when the lens 22 has been adjusted as described hereinbefore, solenoid 121 will become de-energized and spring 122 will urge the arm 104 outwardly to remove the pin 107 from the ink pad 123. Then solenoid 115 will become de-energized to allow spring 114 to swing the forward end of arm 104 downwardly until the arm 104 engages the stop 108, and thus the pin 107 will be aligned with axis A—A, the transverse adjustment described above having been previously performed. Then solenoid 121 will become momentarily energized to draw the arm 104 inwardly which will cause the pin 107 to contact the adjacent surface of the lens 22 and make a small ink impression upon the lens surface at the exact optical center thereof. After such momentary energization of solenoid 121, solenoid 115 will again function to swing the arm 104 upwardly to its inoperative position, after which solenoid 121 again will become energized to draw the arm 104 inwardly whereupon the pin 107 will again be positioned upon the ink pad 123.

From the foregoing it is apparent that a lens 22, after being initially positioned in the device, can be automatically adjusted with respect to the optical axis of the device for determining the relative spacing between the optical center and the geometric center of the lens, after which dotting mechanism can automatically function to make an ink mark or the like upon the surface of the lens in the exact location of the optical center.

It is apparent that modifications in the electronic system and in the indicating mechanism can be provided as desired to improve or alter the device; also that other devices can be employed for moving the lens such as hydraulic, pneumatic or manual controls which can be easily adapted to the apparatus.

It is also apparent that although the centering mechanism has been shown and described as employing means for adjusting the lens 22 under test in a predetermined plane at right angles to axis A—A while retaining the apertured member 56 in a relatively fixed position, it is to be understood that the device can be arranged so that the apertured member 56 will move in a plane at right angles to axis A—A by suitable adjustment means similar to the lens supporting and adjusting means shown in Figs. 1 and 2 while holding the lens 22 in relatively fixed position with its geometric center retained on axis A—A. In such a case, of course, the lens dotting mechanism must necessarily be supported for movement with the apertured member 56.

From the foregoing description it will be apparent that all of the objects and advantages of the invention have been accomplished to provide novel means and method for testing lenses to determine optical characteristics thereof such as the location of the optical center of the lens.

It will also be apparent that many changes may be made in the details of construction and arrangement of parts shown and described without departing from the spirit of the invention as expressed in the accompanying claims. Therefore, it is to be understood that all matter set forth or shown in the accompanying drawings is to be interpreted as illustrative and not in a limiting sense.

We claim:

1. A device for testing a lens to determine the optical center thereof comprising a source of light, a photosensitive device optically aligned with and adapted to receive light passing along a known optical axis from said source of light, means for adjustably supporting a lens to be tested intermediate said source of light and photosensitive device, an opaque member intermediate said source of light and said photosensitive device, said opaque member being positioned in a plane normal to and substantially intersecting said optical axis at the plane of focus of said lens to be tested and said opaque member having at least a pair of scanning apertures therein, the apertures of each pair thereof being disposed substantially equidistant on opposite sides of said known optical axis, a target having a plurality of spaced occluder members disposed between said source of light and lens under test to interrupt and allow the passage of the light at a controlled plurality of spaced intervals so as to spatially modify the light and thereby cause the lens under test to product a plurality of successive images of the edge parts of said spaced occluders at its focal plane, means for effectively scanning said target means to cause each of said images to be temporally successively registered with first one and then another of said apertures whereby the image forming light passing through a particular aperture at the time of image registry therewith will cause the photosensitive device to produce a component of an electric signal of particular amplitude characteristics which are brought about by the manner in which the lens resolves said image at its position of registry with said particular aperture and the image forming light passing through each of the remaining apertures at the time of image registry therewith will cause said photosensitive device to produce the remaining components of said electric signal, each of said remaining components being characterized by the manner in which the lens member resolves said image when at its position of registry with said remaining apertures, said electric signal being standardized when equal resolution of the images is effected at each aperture of said pair of apertures due to the optical center of the lens being aligned in a given relation with said optical axis, said electric signal being varied from said standard when the optical center of the lens under test is off said given relation with said optical axis and unequal resolution of the image is effected at the apertures of each pair thereof, electrical converting means connected to said photosensitive device for converting said amplitude characteristics of the signal into electric current having electronically measurable characteristics depending directly upon the amplitude characteristics of the signal, and operating means electrically connected with said converting means and responding to said measurable characteristics for laterally adjusting the lens under test to the extent necessary to overcome any existing variation from said standard electrical signal as produced by the photosensitive device.

2. A device for testing a lens to determine the optical center thereof comprising a source of light, a photosensitive device optically aligned with and adapted to receive light passing along a known optical axis from said source of light, lens supporting means for supporting a lens member to be tested between said source of light and photosensitive device to cause said light to be focussed, at least in part by the lens member under test, at a predetermined image plane substantially normal to and intersecting said optical axis in front of said photosensitive device, an opaque member between said lens member under test and said photosensitive device, one of said members being adjustable, said opaque member being positioned in a plane substantially coincident with said image plane and having a plurality of paired scanning apertures therein, the apertures of each pair thereof being disposed substantially equidistant on opposite sides of said known optical axis, a target having a plurality of spaced occluder members between said source of light and lens under test to interrupt and allow the passage of the light at a controlled plurality of spaced intervals so as to spatially modify the light and thereby cause the lens under test to produce a plurality of successive images of the edge parts of said spaced occluders at its focal plane, means for effectively scanning said target means to cause each of said images to be temporally successively registered with first one and then another of said apertures whereby the light passing through a particular aperture at the time of the image registry therewith will cause the photosensitive device to produce a component of an electric signal having particular amplitude characteristics which are brought about by and representative of the manner in which the lens resolves said image at its position of registry with said particular aperture and the image forming light passing through each of the remaining apertures at the time of image registry therewith will cause said photosensitive device to produce the remaining components of said electric signal, each of said remaining components being characterized by the manner in which the lens member resolves said image when at its position of registry with said remaining apertures, said electric signal being standardized when equal resolution of the images is effected at each aperture of said pair of apertures due to the optical center of the lens being aligned in substantially coincident relation with said optical axis, said electric signal being varied from said standard when the optical center of the lens under test is off said given relation and unequal resolution of the images is effected at the apertures of said pair thereof, electro-mechanical means responsive to said signal produced by said photosensitive device for adjusting one of said members laterally with respect to said optical axis to the extent necessary to compensate for any existing deviation of the optical center of the lens member under test from said mentioned location coincident with the optical axis.

3. A device for testing a lens member to determine the location of the optical center thereof comprising a source of light, a photosensitive device optically aligned with and adapted to receive light passing along a known optical axis from said source of light, lens supporting means for supporting a lens member to be tested between said source of light and photosensitive device to cause said light to be focussed, at least in part by the lens member under test, at a predetermined image plane substantially normal to and intersecting said optical axis in front of said photosensitive device, an opaque member between said lens member under test and said photosensitive device, at least one of said members being adjustable, said opaque member being positioned in a plane substantially coincident with said image plane and having a plurality of paired scanning apertures therein, the apertures of each pair being disposed substantially equidistant on opposite sides of said known optical axis, a target means comprising a plurality of uniformly spaced occluder members between said source of light and lens member under test for interrupting and allowing passage of the light at a controlled plurality of spaced intervals so as to spatially modify the light and produce a plurality of successive images of the edge parts of said spaced occluders at its focal plane, means for effectively scanning said target means to cause each of said images to be temporally successively registered with first one and then another of said apertures whereby the image forming light passing through a particular aperture at the time of the image registry therewith will cause the photosensitive device to produce a component of an electric signal of particular amplitude characteristics which are brought about by the manner in which the lens resolves said image at its position of registry with said particular aperture and the image forming light passing through each of the remaining apertures at the time of image registry therewith will cause said photosensitive device to produce the remaining components of said electric signal, each of said remaining components being characterized by the manner in which the lens member resolves said image when at its position of registry with said remaining apertures, said electric signal being standardized when equal resolution of the images is effected at each aperture of a respective pair of apertures due to the optical center of the lens being located coincident with said known optical axis, said electric signal being varied from said standard when the optical center of the lens under test is off said position of coincidence with said optical axis and unequal resolution of the images is effected at the apertures of each pair thereof, electrical amplifying means associated with said photosensitive means for amplifying said signal, electrical converting means associated with said amplifying means for converting said amplified signal into a pulsating signal having positive and negative pulses proportional to and representative of the components of the signal from the photosensitive device, the positive pulses representing the results of scanning the leading side edge of one of said spaced occluders of the target means and the negative pulses representing the results of scanning the trailing side edge of one of said spaced occluders of the target means, electrical clipping means associated with said converting means for eliminating either the positive or negative pulses of said pulsating signal, electrical dividing means associated with said clipping means for dividing the remaining pulses into separate pairs of pulses, each pair of pulses related to and representing two components of the signal from the photosensitive device as determined by the image forming light received thereby through a respective pair of apertures, a pair of electrical selecting means associated with said dividing means each receiving one of said divided pairs of pulses and separating therefrom the pulses originating from and representing the intensity characteristics of the image forming light passing through each aperture of a respective pair of apertures, a pair of transforming means associated with each of said selecting means for each receiving one of said separated pulses and transforming said pulse into electrical current for operating motor-drive mechanism, an interpreting means electrically associated with each pair of transforming means for interpreting any existing difference in the electrical current received from each of said transforming means and a balancing means electrically associated with each of said interpreting means and embodying motor-drive mechanism for shifting one of said members in a plane normal to the optical axis an amount sufficient to compensate for the differences in the separated pulses of each of said pair of pulses.

4. The method of locating the optical center of a lens member comprising optically projecting light from a source of illumination along a given axis through a lens member under test, positioning means responsive to light in optical alignment with said light for receiving the light projected through said lens member and for converting said light into electrical energy, positioning an opaque apertured member between said lens under test and said means responsive to light with the apertures therein lying in a plane normal to and at given spaced distances on opposite sides of said given axis, causing said light upon passing through the lens member to focus at an image plane located substantially at the plane of said opaque member, alternately interrupting and allowing passage of the light at a controlled plurality of spaced intervals by means of a plurality of spaced occluder members located in a plane normal to and intersecting said given axis between said lens member and source of illumination to cause said lens member to produce a plurality of successively spaced images of the edge parts of said spaced occluder members at its focal plane, effectively scanning said successively spaced images at a controlled rate to cause said images to be temporally successively registered with first one and then another of said apertures whereby the image forming light passing through a particular aperture at the time of image registry therewith will cause the means responsive to light to produce a component of an electric signal of particular amplitude characteristics which are brought about by the manner in which the lens member resolves said image at its position of registry with said particular aperture and the image forming light passing through each of said remaining apertures at the time of image registry therewith will cause said means responsive to light to produce the remaining components of said electric signal, each of said remaining components being characterised by the manner in which the lens member resolves said image when at its position of registry with said remaining apertures, electrically amplifying said signal, electrically converting said amplified signal into a pulsating signal having a set of positive and a set of negative pulses proportional to and representative of the particular amplitude characteristics of the signal from the means sensitive to light, electrically eliminating one of said sets of of pulses of said pulsating signal, electrically dividing the remaining set of pulses into two pairs of pulses, electrically separating the individual pulses of each of said pairs of pulses, electrically transforming each of the separated pulses of said pairs into an electrical current for operating motor-driven mechanism, electrically interpreting any existing difference in the electrical current obtained from each of the pulses of the respective separated pairs of pulses, and electrically causing said motor-driven mechanism to operate in accordance with said difference in electrical current obtained to cause said mechanism to adjust one of said members relative to said given axis an amount sufficient to compensate for said difference in electric current.

References Cited in the file of this patent

UNITED STATES PATENTS

| | | |
|---|---|---|
| 1,513,842 | Maynard | Nov. 4, 1924 |
| 1,672,671 | Young | June 5, 1928 |
| 2,254,548 | Ruhle et al. | Sept. 2, 1941 |
| 2,267,961 | Tillyer et al. | Dec. 30, 1941 |
| 2,288,430 | Bauman | June 30, 1942 |
| 2,304,814 | Glasser | Dec. 15, 1942 |
| 2,352,179 | Bolsey | June 27, 1944 |
| 2,521,946 | Rathje | Sept. 12, 1950 |